(12) United States Patent
Thompson et al.

(10) Patent No.: US 11,861,273 B2
(45) Date of Patent: Jan. 2, 2024

(54) COMPUTING SYSTEM AND METHOD FOR DEFINING A GUIDE HAVING ONE OR MORE DEFINED SETS OF ORDERED PLY ORIENTATIONS

(71) Applicant: THE BOEING COMPANY, Chicago, IL (US)

(72) Inventors: Richard Joel Thompson, Huntsville, AL (US); Vladimir Balabanov, Mukilteo, WA (US); Adriana Willempje Blom-Schieber, Shoreline, WA (US)

(73) Assignee: THE BOEING COMPANY, Chicago, IL (US)

(*) Notice: Subject to any disclaimer, the term of this patent is extended or adjusted under 35 U.S.C. 154(b) by 894 days.

(21) Appl. No.: 16/714,012

(22) Filed: Dec. 13, 2019

(65) Prior Publication Data

US 2021/0182451 A1 Jun. 17, 2021

(51) Int. Cl.
*G06F 30/20* (2020.01)
*G06F 111/04* (2020.01)
(Continued)

(52) U.S. Cl.
CPC .......... *G06F 30/20* (2020.01); *G06F 2111/04* (2020.01); *G06F 2111/10* (2020.01); *G06F 2113/26* (2020.01)

(58) Field of Classification Search
CPC .. G06F 30/20; G06F 2111/04; G06F 2111/10; G06F 2113/26; G06F 2111/06;
(Continued)

(56) References Cited

U.S. PATENT DOCUMENTS 10,322,792 B2  6/2019 Thompson et al.
10,380,319 B2  8/2019 Thompson et al.
(Continued)

OTHER PUBLICATIONS

Leiva, Juan Pablo, Dipankar Ghosh, and Naveen Rastogi. "A new approach in stacking sequence optimization of composite laminates using genesis structural analysis and optimization software." 9th AIAA/ISSMO Symposium on Multidisciplinary Analysis and Optimization. 2002. (Year: 2002).*
(Continued)

*Primary Examiner* — Michael Edward Cocchi
(74) *Attorney, Agent, or Firm* — Alston & Bird LLP

(57) ABSTRACT

A method, a computing system and a computer program product are provided to efficiently define a guide that includes one or more defined sets of ordered ply orientations. In the context of a method, a plurality of stacking sequence rules are received. The method defines the guide including the one or more defined sets of ordered ply orientations in accordance with a constrained, linear integer optimization formulation. In this regard, the method defines the guide by dividing the guide into a plurality of blocks and determining a plurality of sublaminate stacks that satisfy the stacking sequence rules and that have a size limited by a size of the blocks. For each of the plurality of blocks, the method determines in accordance with the constrained, linear integer optimization formulation a sublaminate stack from among the plurality of sublaminate stacks that is compatible with a respective block.

20 Claims, 6 Drawing Sheets

(51) Int. Cl.
　　　*G06F 113/26*　　　(2020.01)
　　　*G06F 111/10*　　　(2020.01)
(58) Field of Classification Search
　　　CPC .......... G06F 30/25; G06F 30/27; G06F 30/28;
　　　　　　　　　　　　　　　　　　　　　　　　B29C 70/30
　　　See application file for complete search history.

(56) References Cited

U.S. PATENT DOCUMENTS

| | | |
|---|---|---|
| 10,467,350 B2 | 11/2019 | Kang et al. |
| 2010/0121625 A1 | 5/2010 | Krog |
| 2017/0228494 A1* | 8/2017 | Thompson .......... G05B 19/4097 |
| 2019/0286788 A1 | 9/2019 | Thompson et al. |

OTHER PUBLICATIONS

Nagendra, Somanath. Optimal stacking sequence design of stiffened composite panels with cutouts. Virginia Polytechnic Institute and State University, 1993. (Year: 1993).*

Haftka, Raphael T., and Joanne L. Walsh. "Stacking-sequence optimization for buckling of laminated plates by integer programming."AIAA journal 30.3 (1992): 814-819. (Year: 1992).*

EP Application No. 20213243, European Search Report dated Apr. 30, 2021.

EP Application No. 20213243.7, extended European Search Report and Written Opinion dated May 11, 2021.

Irisarri, F.-X., et al., "Optimal design of laminated composite structures with ply drops using stacking sequence tables," Composite Structures, 107:559-569, (2014).

\* cited by examiner

```
┌─────────────────────────────────────────────┐  ╱40
│      RECEIVE STACKING SEQUENCE RULES        │
└─────────────────────────────────────────────┘
                      ↓
┌─────────────────────────────────────────────┐  ╱42
│ DEFINE THE GUIDE WITH A CONSTRAINED, LINEAR │
│        INTEGER OPTIMIZATION FORMULATION      │
└─────────────────────────────────────────────┘
```

Figure 5

```
┌───────────────────────────────────────────────────────┐ ╱50
│        DIVIDE THE GUIDE INTO A PLURALITY OF BLOCKS     │
└───────────────────────────────────────────────────────┘
                            ↓
┌───────────────────────────────────────────────────────┐ ╱52
│      DETERMINE A PLURALITY OF SUBLAMINATE STACKS THAT  │
│     SATISFY THE STACKING SEQUENCE RULES AND HAVE A SIZE│
│              LIMITED BY THE SIZE OF THE BLOCKS          │
└───────────────────────────────────────────────────────┘
                            ↓
┌───────────────────────────────────────────────────────┐ ╱54
│     DETERMINE A MATRIX $R_{kbs}$ OF PLY COUNTS OF      │
│  SUBLAMINATE STACKS THAT IS COMPATIBLE WITH CANDIDATE  │
│       BLOCK b THAT HAVE AN ORIENTATION ANGLE k         │
└───────────────────────────────────────────────────────┘
                            ↓
┌───────────────────────────────────────────────────────┐ ╱56
│   DEFINE A MATRIX $N_{bs}$ OF A NUMBER OF VARIATIONS OF│
│      SUBLAMINATE STACKS THAT REMAIN COMPATIBLE WITH    │
│ CANDIDATE BLOCK b AND THAT HAVE THE SAME COUNTS OF PLIES│
│     $R_{kbs}$ FOR A PLURALITY OF ORIENTATION ANGLES k  │
└───────────────────────────────────────────────────────┘
                            ↓
┌───────────────────────────────────────────────────────┐ ╱58
│  FOR EACH CANDIDATE BLOCK, DETERMINE IN ACCORDANCE     │
│  WITH THE CONSTRAINED, LINEAR INTEGER OPTIMIZATION     │
│   FORMULATION A SUBLAMINTE STACK FROM AMONG THE        │
│   SUBLAMINATE STACKS THAT IS COMPATIBLE WITH A         │
│            RESPECTIVE CANDIDATE BLOCK                   │
│  ┌─────────────────────────────────────────────────┐   │
│  │    SELECT, FOR EACH CANDIDATE BLOCK, THE         │   │
│  │    SUBLAMINATE STACK THAT MAXIMIZES THE          │╱60│
│  │ QUANTITY OF SUBLIMINATE STACKS THAT HAVE THE     │   │
│  │ SAME PLY COUNTS AND ARE COMPATIBLE WITH THE      │   │
│  │          RESPECTIVE CANDIDATE BLOCK              │   │
│  └─────────────────────────────────────────────────┘   │
└───────────────────────────────────────────────────────┘
```

Figure 6

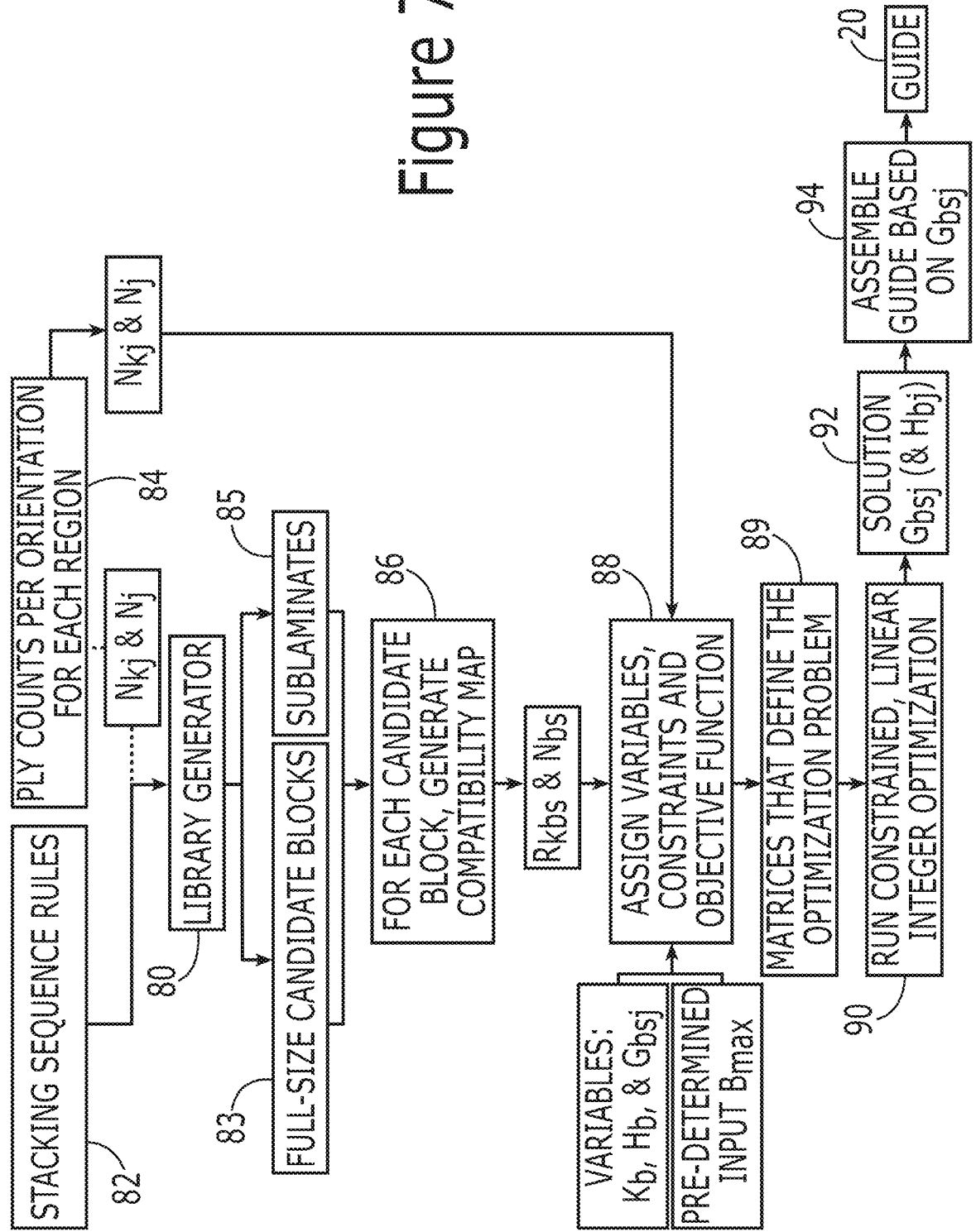

| | | | | |
|---|---|---|---|---|
| 45° | 45° | 45° | 45° | * |
| 0° | * | * | * | * |
| -45° | -45° | -45° | * | * |
| 90° | 90° | * | * | * |
| 45° | * | * | * | 45° |
| 0° | 0° | * | * | * |
| -45° | * | * | -45° | -45° |
| 90° | * | 90° | 90° | 90° |
| 45° | * | * | * | * |
| 0° | * | 0° | 0° | 0° |
| -45° | * | * | * | * |
| 90° | * | * | * | * |

COMPUTING SYSTEM AND METHOD FOR DEFINING A GUIDE HAVING ONE OR MORE DEFINED SETS OF ORDERED PLY ORIENTATIONS

TECHNOLOGICAL FIELD

An example embodiment relates generally to a method, a computing system and a computer program product for defining a guide comprised of one or more defined sets of ordered ply orientations and, more particularly, to a method, a computing system and a computer program product for defining the guide in accordance with a constrained, linear integer optimization formulation.

BACKGROUND

Composite structures are formed of a plurality of composite plies that are stacked upon one another and consolidated to form an integral structure. The composite plies have corresponding ply orientations that define the orientation of a majority of the fibers or other reinforcement members within the composite ply. Thus, in designing a composite structure, the particular sequence of ply orientations must be defined since the particular sequence of ply orientations has an appreciable impact upon the properties of the resulting composite structure.

As a result of the myriad of possible sequences of ply orientations, the design of a composite structure including the order of the ply orientations may be a time consuming process if performed manually and may be a processing intensive process if performed in the at least partially automated manner. Moreover, even if automated, the design of a composite structure generally requires manual application of the automation tools. The time and processing resources expended in the design of a composite structure are even further increased in order to account for changes in the composite structure in the transition between different regions of the composite structure. For example, a first region of a composite structure may be designed to be thicker and stiffer while a second region of the integral composite structure may be defined to be thinner and more flexible. In this instance, one or more of the composite plies are generally dropped or eliminated in the transition from the first region to the second region of the composite structure. Thus, not only must the composite structure including the sequence of plies be designed to satisfy the different requirements for its first and second regions, but the composite structure must be designed in such a manner that one or more of the composite plies may be dropped in the transition from the first region to the second region.

In order to facilitate the design of composite structures, sets of ordered ply orientations, that is, sets of composite plies having certain ply orientations, are defined with each set of ordered ply orientation being determined to satisfy the stacking sequence rules with which the composite structure must comply. As such, the composite structure may then be designed to include one or more of the sets of ordered ply orientations. By including one or more sets of ordered ply orientations, the design of the composite structure is made more efficient in that the composite plies of the sets of ordered ply orientations need not be again evaluated along with the other composite plies for satisfaction of the stacking sequence rules since a set of ordered ply orientations, by definition, satisfies the stacking sequence rules.

The sets of ordered ply orientations may be defined manually. However, the sets of ordered ply orientations that are defined manually may sometimes fail to satisfy the stacking sequence rules such that a composite structure designed utilizing one or more of the sets of ordered ply orientation may correspondingly fail to satisfy the stacking sequence rules. Alternatively, the sets of ordered ply orientations may be defined utilizing a random-perturbation optimization solver. However, the sets of ordered ply orientations created by a random-perturbation optimization solver do not necessarily result in the optimal or best set of ordered ply orientations relative to the stacking sequence rules such that a composite structure that is designed utilizing one or more of the sets of ordered ply orientation may similarly be sub-optimal.

BRIEF SUMMARY

A method, a computing system and a computer program product are provided in accordance with an example embodiment in order to efficiently define a guide comprised of one or more defined sets of ordered ply orientations. Additionally, by reliance upon a constrained, linear integer optimization formulation to define a guide, the resulting guide permits the plurality of stacking sequence rules to be satisfied, such as in an optimal manner. In order to provide for the efficient definition of the guide, the method, computing system and computer program product of an example embodiment select one or more sublaminate stacks, that is, one or more defined sets of ordered ply orientations, from a plurality of sublaminate stacks to form the guide that serve to maximize the quantity of sublaminate stacks that are compatible with a respective block of the guide, thereby providing for enhanced flexibility and, as a result, efficiency in conjunction with the design of the composite structure based upon the guide.

In an example embodiment, a method is provided for defining a guide comprised of one or more defined sets of ordered ply orientations. The method includes receiving a plurality of stacking sequence rules and defining the guide comprised of the one or more defined sets of ordered ply orientations in accordance with a constrained, linear integer optimization formulation. In this regard, the method defines the guide by dividing the guide into a plurality of blocks and determining a plurality of sublaminate stacks that satisfy the stacking sequence rules and that have a size limited by a size of the blocks. For each of the plurality of blocks, the method determines in accordance with the constrained, linear integer optimization formulation a sublaminate stack from among the plurality of sublaminate stacks that is compatible with a respective block, such as by selecting the sublaminate stack for a respective block based upon a quantity of other sublaminate stacks that have the same ply counts and are compatible with the respective block.

The method of an example embodiment also includes defining a matrix $R_{kbs}$ of ply counts of plies of sublaminate stack s that is compatible with candidate block b that have an orientation angle k. The method of this example embodiment may also include defining a matrix $N_{bs}$ of a number of variations of sublaminate stack s that remain compatible with candidate block b and that have the same ply counts $R_{kbs}$ for a plurality of orientation angles k. In an example embodiment, the plurality of sublaminate stacks are determined and the matrices $R_{kbs}$ and $N_{bs}$ are defined prior to determining the sublaminate stacks in accordance with the constrained, linear integer optimization formulation.

In relation to selecting the sublaminate stack for the respective block, the method of an example embodiment includes selecting, for each of the plurality of blocks, the sublaminate stack for the respective block that maximizes the quantity of sublaminate stacks that have the same ply counts and are compatible with the respective block. In this example embodiment, the method determines the sublaminate stack in accordance with the constrained, linear integer optimization formulation by constraining the constrained, linear integer optimization formulation such that a total number of plies across the sublaminate stacks determined for the plurality of blocks of the guide equals a predefined ply count. The method of an example embodiment determines the sublaminate stacks in accordance with the constrained, linear integer optimization formulation by constraining the constrained, linear integer optimization formulation such that no more than one sublaminate stack is selected for a respective block.

In another example embodiment, a computing system is provided for defining a guide comprised of one or more defined sets of ordered ply orientations. The computing system includes processing circuitry configured to receive a plurality of stacking sequence rules and to define the guide comprised of the one or more defined sets of ordered ply orientations in accordance with a constrained, linear integer optimization formulation. The processing circuitry is configured to define the guide by dividing the guide into a plurality of blocks and determining a plurality of sublaminate stacks that satisfy the stacking sequence rules and that have a size limited by a size of the blocks. For each of the plurality of blocks, the processing circuitry is also configured to define the guide by determining in accordance with the constrained, linear integer optimization formulation a sublaminate stack from among the plurality of sublaminate stacks that is compatible with a respective block.

The processing circuitry of an example embodiment is further configured to define a matrix $R_{kbs}$ of ply counts of plies of sublaminate stack s that is compatible with candidate block b that have an orientation angle k. In this example embodiment, the processing circuitry may be further configured to define a matrix $N_{bs}$ of a number of variations of sublaminate stack s that remain compatible with candidate block b and that have the same ply counts $R_{kbs}$ for a plurality of orientation angles k. In this example embodiment, the processing circuitry may be configured to determine the plurality of sublaminate stacks and to define the matrices $R_{kbs}$ and $N_{bs}$ prior to determining the sublaminate stacks in accordance with the constrained, linear integer optimization formulation.

The processing circuitry of an example embodiment is configured to determine the sublaminate stack in accordance with the constrained, linear integer optimization formulation by selecting the sublaminate stack for a respective block based upon a quantity of other sublaminate stacks that have the same ply counts and are compatible with the respective block. In this example embodiment, the processing circuitry is configured to select the sublaminate stack for the respective block by selecting, for each of the plurality of blocks, the sublaminate stack for the respective block that maximizes the quantity of sublaminate stacks that have the same ply counts and are compatible with the respective block. The processing circuitry of this example embodiment is also configured to determine the sublaminate stacks in accordance with the constrained, linear integer optimization formulation by constraining the constrained, linear integer optimization formulation such that a total number of plies across the sublaminate stacks determined for the plurality of blocks of the guide equals a predefined ply count. The processing circuitry of an example embodiment is configured to determine the sublaminate stack in accordance with the constrained, linear integer optimization formulation by constraining the constrained, linear integer optimization formulation such that no more than one sublaminate stack is selected for a respective block.

In a further example embodiment, a computer program product is provided for defining a guide comprised of one or more defined sets of ordered ply orientations. The computer program product include at least one non-transitory computer-readable storage medium having computer-executable program code instructions stored therein with the program code instructions configured to receive a plurality of stacking sequence rules and to define the guide comprised of the one or more defined sets of ordered ply orientations in accordance with a constrained, linear integer optimization formulation. The program code instructions configured to define the guide include program code instructions configured to divide the guide into a plurality of blocks and to determine a plurality of sublaminate stacks that satisfy the stacking sequence rules and that have a size limited by a size of the blocks. For each of the plurality of blocks, the program code instructions configured to define the guide also include program code instructions configured to determine in accordance with the constrained, linear integer optimization formulation a sublaminate stack from among the plurality of sublaminate stacks that is compatible with a respective block.

The program code instructions of an example embodiment are further configured to define a matrix $R_{kbs}$ of ply counts of plies of sublaminate stack s that is compatible with candidate block b that have an orientation angle k. The program code instructions of this example embodiment may be further configured to define a matrix $N_{bs}$ of a number of variations of sublaminate stack s that remain compatible with candidate block b and that have the same ply counts $R_{kbs}$ for a plurality of orientation angles k. The program code instructions configured to determine sublaminate stack in accordance with the constrained, linear integer optimization formulation may include program code instructions configured to select the sublaminate stack for a respective block based upon a quantity of other sublaminate stacks that have the same ply counts and are compatible with the respective block.

In an example embodiment, the program code instructions that are configured to select the sublaminate stack for the respective block comprise program code instructions configured to select, for each of the plurality of blocks, the sublaminate stack for the respective block that maximizes the quantity of sublaminate stacks that have the same ply counts and are compatible with the respective block. In this example embodiment, the program code instructions configured to determine the sublaminate stack in accordance with the constrained, linear integer optimization formulation comprise program code instructions configured to constrain the constrained, linear integer optimization formulation such that a total number of plies across the sublaminate stacks determined for the plurality of blocks of the guide equals a predefined ply count. In an example embodiment, the program code instructions configured to determine the sublaminate stacks in accordance with the constrained, linear integer optimization formulation include program code instructions configured to constrain the constrained, linear integer optimization formulation such that no more than one sublaminate stack is selected for a respective block.

BRIEF DESCRIPTION OF THE DRAWINGS

Having described certain examples of the present disclosure in general terms above, reference will now be made to the accompanying drawings, which are not necessarily drawn to scale and wherein:

FIG. 3 is a representation of a guide comprised of a defined set of ordered ply orientations and a plurality of sublaminate stacks that are compatible with the guide;

FIG. 4 is a block diagram of a computing system that may be specifically configured in accordance with an example embodiment of the present disclosure;

FIG. 5 is a flowchart illustrating the operations performed, such as by the computing system of FIG. 4, in order to define a guide in accordance with an example embodiment of the present disclosure;

FIG. 6 is another flowchart illustrating operations performed, such as by the computing system of FIG. 4, in order to define the guide in accordance with a constrained, linear integer optimization formulation pursuant to an example embodiment of the present disclosure;

FIG. 7 is yet another flowchart illustrating operations performed, such as by the computing system of FIG. 4, in order to define the guide in accordance with a constrained, linear integer optimization formulation pursuant to an example embodiment of the present disclosure;

DETAILED DESCRIPTION

Some examples of the present disclosure will now be described more fully hereinafter with reference to the accompanying drawings, in which some, but not all examples of the present disclosure are shown. Indeed, the present disclosure may be embodied in many different forms and should not be construed as limited to the examples set forth herein; rather, these examples are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with examples of the present disclosure. Thus, use of any such terms should not be taken to limit the spirit and scope of the present disclosure.

A method, computing system and computer program product are provided in order to provide a guide comprised of one or more defined set of ordered ply orientations. In this regard, reference to a defined set of ordered ply orientations is, in fact, a reference to a set of composite plies having corresponding ply orientations and ordered in a particular sequence. The guide facilitates the design of a composite structure so as to permit the composite structure to be designed in an efficient manner and to be in compliance with a plurality of stacking sequence rules. The composite structure that is designed and fabricated in reliance upon the guide that is defined in accordance with an example embodiment may be any of a wide variety of composite structures that are used in a variety of different applications, such as aerospace applications, automotive applications, construction or other structural applications, etc.

Figure 1:
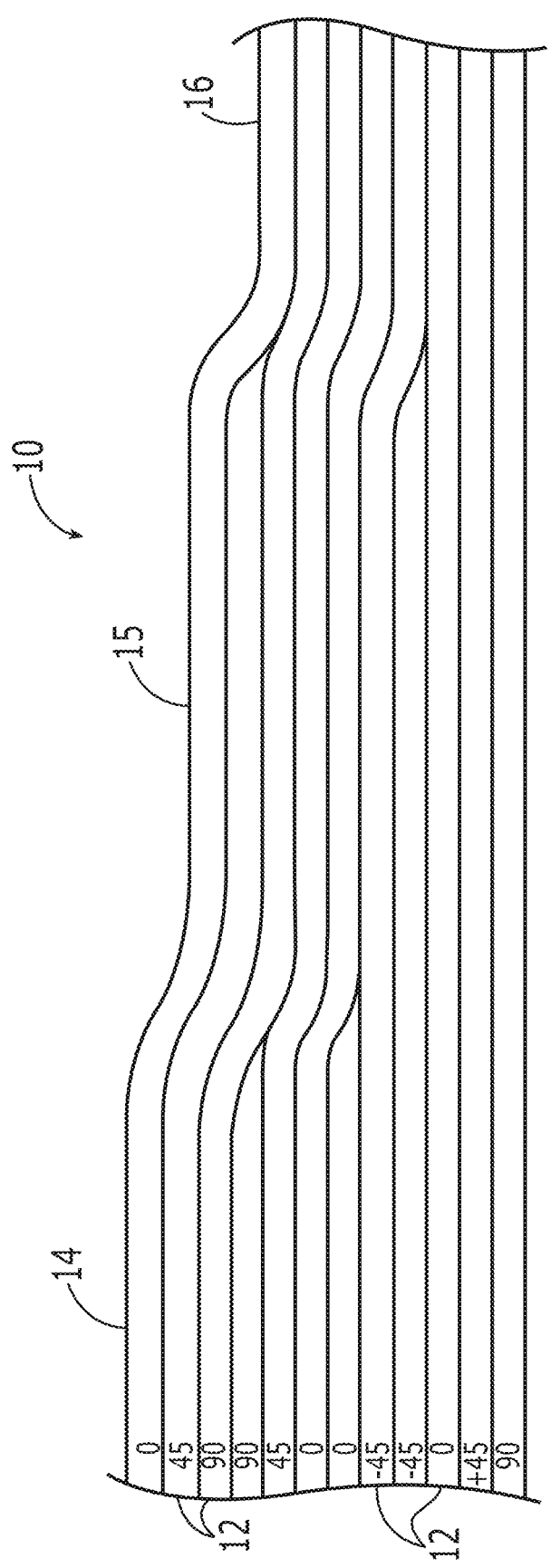
FIG. 1 is a side view of a composite structure illustrating a plurality of composite plies having different ply orientations with some of the composite plies being dropped in a transition between different regions of the composite structure.

By way of example of a composite structure, reference is now made to FIG. 1 which depicts a cross-sectional side view of a composite structure 10. As shown, the composite structure includes a plurality of composite plies 12, each of which has a ply orientation as designated as by the angular value with which each composite ply is labeled. As shown, the composite plies may include any of a plurality of different ply orientations, such as 0 degrees, +45 degrees, −45 degrees or 90 degrees relative to a reference.

A composite structure 10, such as the composite structure of FIG. 1, may include different regions that have different numbers of composite plies 12. As shown in FIG. 1, for example, the composite structure includes first, second and third regions 14, 15, 16. The second region includes fewer composite plies than the first region and the third region includes fewer composite plies than the second region. In this regard, several of the composite plies of the first region of the composite structure are dropped or terminated in the transition from the first region to the second region, and similarly several of the composite plies of both the first and second regions of the composite structure are dropped or terminated in the transition from the second region to the third region. By dropping one or more plies in the transition between regions of a composite structure, the resulting structural characteristics of the different regions of the composite structure are different and the size, such as the thickness of the resulting composite structure, is also different.

A composite structure 10 must generally be designed to satisfy a plurality of stacking sequence rules. The stacking sequence rules define a plurality of different rules governing the sequence in which composite plies may be stacked, such as the sequence of ply orientations of the stacked composite plies, to construct the composite structure. As the different ply orientations have different structural characteristics and the different sequences of ply orientations correspondingly have different structural characteristics, the stacking sequence rules are defined in order to ensure that the resulting composite structure has the desired structural characteristics, such as the desired strength and stiffness.

Figure 2:
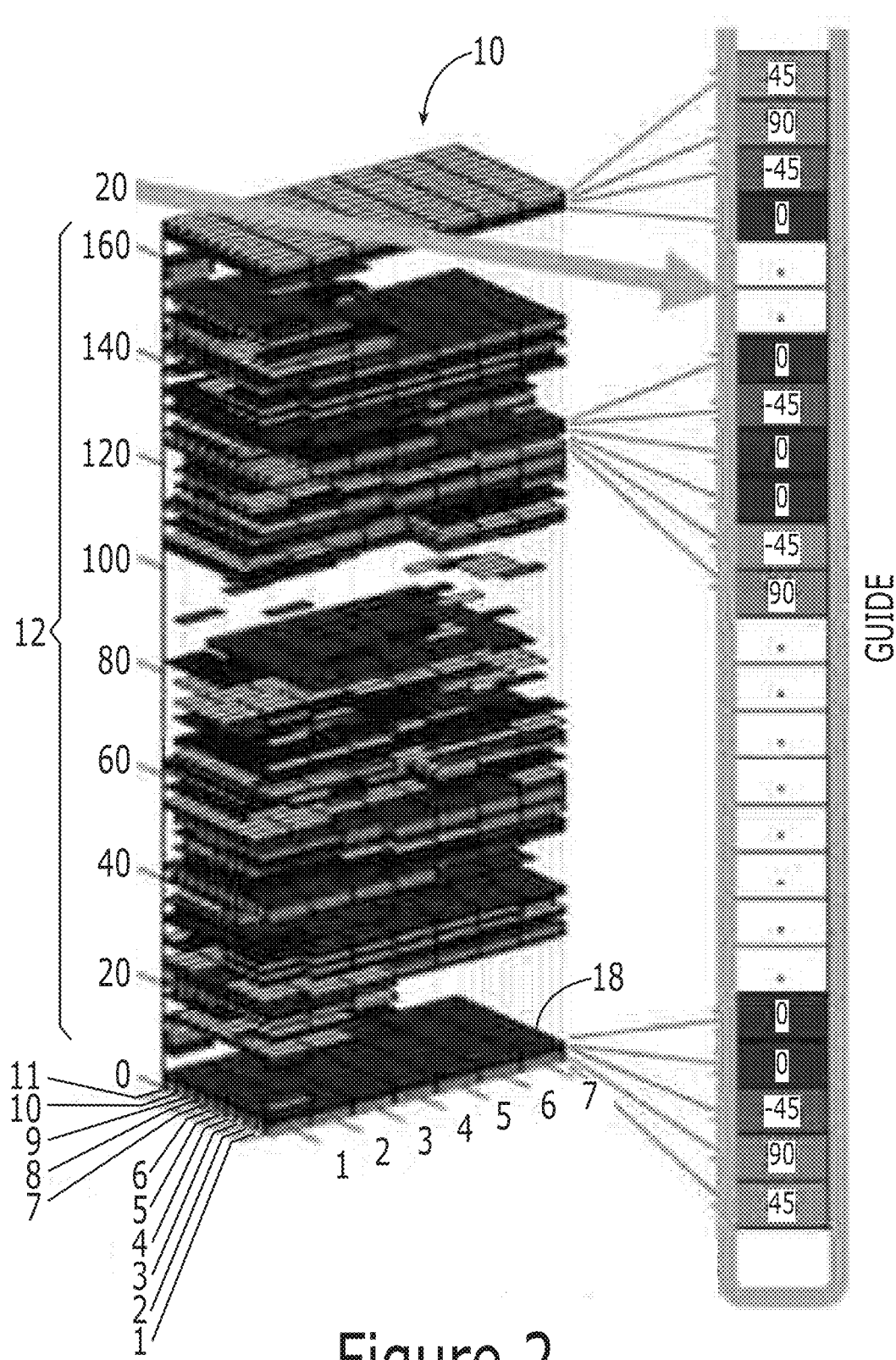
FIG. 2 is a perspective view illustrating different combinations of composite plies having different ply orientations that serve to form different panels of a composite structure.

Another representation of a composite structure formed of a plurality of composite plies having different ply orientations is shown in FIG. 2 in the context of a stacking sequence/ply shape optimization problem. In FIG. 2, the design of a composite structure 10 comprised of a plurality of panels 18 is depicted. In this example, the composite structure includes seventy-seven panels arranged in a rectangular shape with seven panels on one side and eleven panels on the other side, that is, 7 panels×11 panels. Each panel of the composite structure is comprised of a plurality of composite plies with the order in which the composite plies are to be stacked depicted vertically in FIG. 2 with the vertical gaps between the composite plies representing other composite plies (such as composite plies included in one or more other panels) that have been dropped and therefore eliminated from the respective panel. As shown, each panel of the composite structure may include a different combination of composite plies so as to result in a number of composite plies being dropped in the transition from one panel to an adjacent panel with each of the panels required to satisfy the stacking sequence rules for the composite structure, thereby evidencing the complexity associated with the design of a composite structure. As a point of reference, it is noted that if the composite plies of FIG. 2 were collapsed by removing the vertical gaps and layering the composite plies one on top of another, the resulting structure would be a composite structure 10 of the type shown in FIG.

1. In this regard, a composite structure of the type shown in FIG. 1 represents a final output product, while FIG. 2 represents the inputs that are provided to a layup machine or the like to fabricate a composite structure of the type depicted in FIG. 1.

In order to facilitate the design of the composite structure, such as by ensuring compliance with the stacking sequence rules and increasing the efficiency with which the composite structures are designed, the method, computing system and computer program product of an example embodiment define a guide comprised of a plurality of composite plies arranged in one or more defined sets of ordered ply orientations. In this regard, the guide defines an ordered arrangement of a plurality of composite plies having respective ply orientations. The guide of an example embodiment includes at least as many composite plies as the maximum quantity of composite plies to be included include within the composite structure and, in some embodiments, includes more composite plies than are to be included in the resulting composite structure. By way of example of a guide, FIG. 2 depicts a guide 20 that designates a plurality of composite plies having respective ply orientations and arranged in a predefined order. As represented by the association of certain composite plies of the guide with composite plies of panel 7, panel 7 and each of the panels of the composite structure are designed so as to be compliant with the guide.

In terms of being compliant with the guide and as the composite plies of panel 7 demonstrate, the composite plies of a panel need not include every composite ply of the guide 20, but the composite plies of the panel are included in the guide and are in the same relative order defined by the guide, that is, the composite plies of a panel are in the same order as those same composite plies are arranged in the guide even though some of the intervening composite plies represented by the guide may have been dropped or eliminated from the panel. In other words, certain composite plies of the guide may be dropped with the remainder of the composite plies of the guide arranged in the order defined by the guide forming the respective panel.

Figures 3, 4:
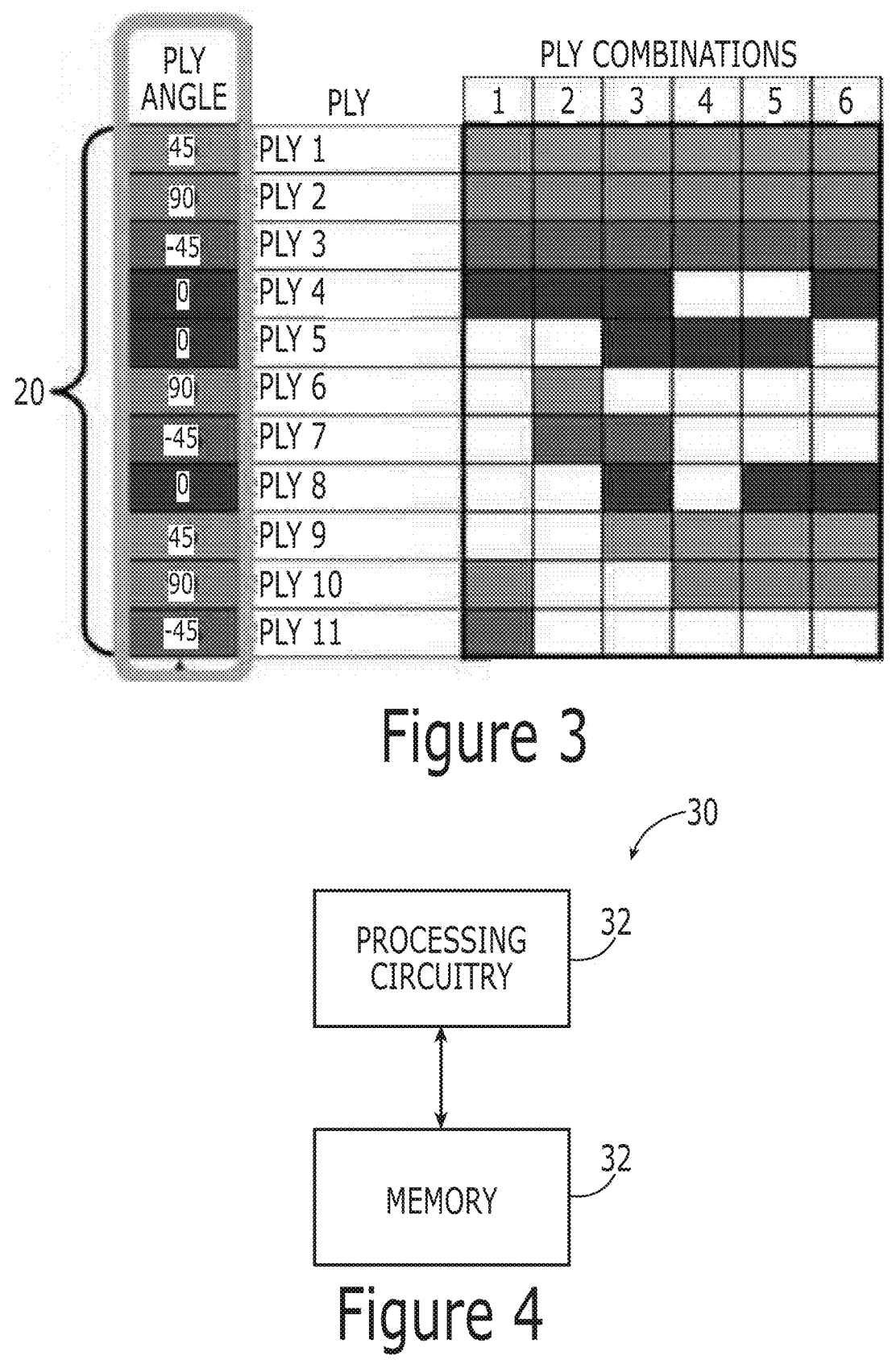

FIG. 3 provides another example of a guide 20. The guide of FIG. 3 is relatively small in terms of the number of composite plies and is referenced herein by way of an example. In a number of embodiments, however, the guide is comprised of many more composite plies, such as a hundred or more composite plies. As shown in FIG. 3, the guide includes a plurality of composite plies in a predefined order. Each composite ply has a respective ply orientation as designated by the angular value associated with each composite ply. The plurality of composite plies that form the guide need not necessarily satisfy the plurality of stacking sequence rules that govern the composite structure that is to be defined. However, subsets of the composite plies of the guide do satisfy the stacking sequence rules and may be utilized in the design and construction of the resulting composite structure.

By way of example of the different combinations of composite plies that are compliant with the guide 20 and that may be utilized in the design of a composite structure, FIG. 3 includes a plurality of the different combinations of composite plies in the columns to the right of the guide. In this regard, each column represents a different combination of composite plies from the guide with those boxes of a column that are shaded indicating the inclusion of the corresponding composite plies of the guide in the combination and those boxes that are unshaded indicating the absence of the corresponding composite plies of the guide from the combination. Although many different combinations that composite plies may be defined with each combination being compliant with, that is, satisfying the stacking sequence rules, and with each combination being compliant with the guide in terms of having composite plies with ply orientations in the same sequence as defined by the guide (even though one or more composite plies defined by the guide may have been dropped or eliminated), FIG. 3 illustrates seven different combinations of composite plies, all of which are compliant with the guide and with the stacking sequence rules.

As noted above, a computing system 30 is provided for defining a guide 20 comprised of composite plies having one or more defined sets of ordered ply orientations. A computing system may be embodied by any of a wide variety of computers including, for example, a server, a computer workstation, a personal computer, a plurality of network computing devices or the like. Regardless of the type of computer that embodies the computing system, the computing system of an example embodiment is depicted in FIG. 4 and includes processing circuitry 32 and optionally an associated memory device 34. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the computing system to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 32 may be embodied in a number of different ways and may, for example, include one or more processing devices configured to perform independently. Additionally or alternatively, the processing circuitry may include one or more processors configured in tandem via a bus to enable independent execution of software instructions, pipelining, and/or multithreading. The use of the terms "processor" or "processing circuitry" may be understood to include a single core processor, a multi-core processor, multiple processors, remote or "cloud" processors, or any combination thereof.

In an example, the processing circuitry 32 may include one or more dedicated processors, controllers, specially configured field programmable gate arrays (FPGAs), or application specific interface circuits (ASICs) to perform its corresponding functions. The processing circuitry may additionally or alternatively be implemented using a processor executing software stored in a memory device. In this fashion, the processing circuitry may therefore be implemented using special-purpose components implemented purely via hardware design or may utilize hardware components that execute computer software designed to facilitate performance of the functions of the processing circuitry.

As shown in FIG. 4, the processing circuitry 32 may also include or be associated with the memory device 34 and the processing circuitry of this example may be configured to execute software instructions stored in the memory device or otherwise accessible to the processing circuitry. In this example, the memory device may be configured to store information, data, content, applications, software instructions, or the like, for enabling the processing circuitry to carry out various functions in accordance with examples contemplated herein. Alternatively or additionally, the processing circuitry may be configured to execute hard-coded functionality. As such, whether configured by hardware or software methods, or by a combination of hardware with software, the processing circuitry may represent an entity (e.g., physically embodied in circuitry) capable of performing operations according to an example of the present disclosure while configured accordingly. Alternatively, as another example, when the processing circuitry is embodied as an executor of software instructions, the software instructions may specifically configure the circuitry to perform the algorithms and/or operations described herein when the software instructions are executed.

Referring now to FIG. 5, a flowchart depicting the operations performed, such as by the computing system 30 of FIG. 4, in order to define a guide 20 comprised of a plurality of composite plies that are arranged to include one or more defined sets of ordered ply orientations is depicted. The guide may be defined in order to arrange composite plies having respective ply orientations in various contexts, such as in the context of a stacking sequence/ply shape optimization problem as in FIG. 2. As shown in block 40 of FIG. 5, the computing system, such as the processing circuitry 32, is configured to receive a plurality of stacking sequence rules. The stacking sequence rules may be predefined, such as for the particular type of composite structure that is to be designed, and may be stored by the memory device 34 and provided to the processing circuitry. Alternatively, the plurality of stacking sequence rules may be provided to the processing circuitry by a user, such as a scientist or technician, responsible for designing the resulting composite structure 10.

As shown in block 42, the computing system 30, such as the processing circuitry 32, is also configured to define the guide 20 that is comprised of a plurality of composite plies that are arranged so as to include one or more defined sets of ordered ply orientations in accordance with a constrained, linear integer optimization formulation. As a result of the reliance upon a constrained, linear integer optimization formula, the computing system and method of an example embodiment ensure that the resulting composite structure 10 complies with the plurality of stacking sequence rules and determine the plurality of composite plies and their respective ply orientations and the order in which the plurality of composite plies having respective ply orientations are stacked in an efficient manner.

In order to define the guide 20 including the plurality of composite plies that are arranged so as to include one or more defined sets of ordered ply orientations, the computing system 30, such as the processing circuitry 32, is initially configured to divide the guide into a plurality of blocks, each containing a set of consecutive plies. See block 50 of FIG. 6. The size of the blocks, i.e. the number of plies contained in a block, and, thus, the number of blocks into which a guide having a predetermined number of composite plies stacked in an ordered sequence is divided may be predefined. For example, a block may have a predefined size of 10 composite plies such that a guide comprised of an ordered sequence of 80 composite plies is divided into 8 blocks designated b=1, 2, 3, . . . 8. In this example, a guide that includes an ordered sequence of composite plies designated 1, 2, . . . 80 will be divided into 8 blocks with block 1 including composite plies 1-10, block 2 including composite plies 11-20, . . . block 8 including composite plies 71-80. The guide will be formed by stacking the blocks together, such that the ordered sequence of composite plies is determined by the ordered sequences of each of the blocks and the arrangement of the blocks within the guide. While each of the blocks of the foregoing example has the same number of composite plies as a result of the number of blocks dividing evenly into the number of composite plies of the guide, the blocks of another example may include different numbers of composite plies.

The number of blocks into which the guide will be divided need not be predefined, and the composition of the blocks in terms of the size of the blocks and the composite plies included in each block also need not be defined in advance. Instead, the blocks may be defined as described below in order to increase the flexibility in terms of the sublaminate stacks that are compliant with a respective block and that may be utilized to form a region of the composite structure. In relation to dividing the guide into a plurality of blocks, the computing system 30, such as the processing circuitry 32, is therefore configured to define a plurality of candidate blocks. The candidate blocks may have different sizes and may include different combinations of composite plies such that one or more combinations of the candidate blocks can be assembled in one or various manners so as to provide each of the composite plies of the guide. The number of candidate blocks is larger than the total number of blocks required to form the guide. Candidate blocks need not be unique. By way of further illustration, FIG. 7 is another, more detailed flow diagram of the operations performed by the computing system, such as the processing circuitry. As shown in block 80, the computing device, such as the processing circuitry, of this example embodiment includes a library generator function in order to define a plurality of candidate blocks based upon the stacking sequence rules 82.

In order to define the guide 20, a plurality of sublaminate stacks are initially defined. The sublaminate stacks are stacks of composite plies having a size limited by the size of the blocks, that is, the maximum size of a sublaminate stack is no greater than and, in at least some embodiments, is equal to the size of the blocks. Some of the sublaminate stacks, however, include fewer composite plies than the size of the blocks. Each sublaminate stack includes a different combination of composite plies having respective ply orientations and disposed or stacked in a particular order. The differences between the sublaminate stacks may be represented by different quantities of plies that form the sublaminate stacks such as a sublaminate stack comprised of 8 composite plies being different than a sublaminate stack of 10 composite plies regardless of the order in which the composite plies are stacked. Additionally, sublaminate stacks having the same quantity of composite plies are different from one another in an instance in which the composite plies are stacked such that one or more of the composite plies in one sublaminate stack has a different orientation than the corresponding composite ply in another sublaminate stack. In this regard, reference herein to composite plies being the same or different is in relation to the ply orientations of the composite plies, such that composite plies that have the same ply orientations are considered to be the same, while composite plies that have different ply orientations are considered to be different. In any event, the computing system, such as a processing circuitry is configured to determine a plurality of sublaminate stacks comprised of different combinations of composite plies that satisfy the stacking sequence rules and with the size of the sublaminate stacks limited by the size of the blocks, as shown in block 52 of FIG. 6 and as shown in blocks 83 and 85 of FIG. 7 based upon the stacking sequence rules 82 and the ply counts 84 per orientation for each region.

The computing system 30, such as the processing circuitry 32, is configured to evaluate the plurality of sublaminate stacks and to eliminate the sublaminate stacks that fail to satisfy the stacking sequence rules. Thus, all of the sublaminate stacks that remain following the elimination of the sublaminate stacks that fail to satisfy the stacking sequence rules do satisfy the stacking sequence rules. The resulting sublaminate stacks that satisfy the stacking sequence rules are designated by an index s such that the first sublaminate stack is designated as s=1, the second sublaminate stack is designated as s=2, etc.

In addition to this initial determination of the plurality of rule-compliant sublaminate stacks s, the computing system 30, such as the processing circuitry 32, defines a matrix $R_{kbs}$ that designates the number of composite plies of sublaminate stack s that is compatible with candidate block b that have orientation angle k. See block 54 of FIG. 6. Thus, entries in the matrix $R_{kbs}$ are determined for each candidate block b. For candidate block b, each rule-compliant sublaminate stacks is evaluated to determine if the sublaminate stacks is compatible with the candidate block b. In this regard, the compatibility of a sublaminate stack s with a candidate block b is determined by whether the composite plies as ordered by the sublaminate stack s appear within the candidate block b in the same order. In making this determination, the presence of intervening composite plies in the candidate block b does not render the sublaminate stacks incompatible as the intervening composite plies of block b that do not appear within the sublaminate stacks can be dropped. However, each of the composite plies of sublaminate stack s having respective ply orientations must appear in the same order in candidate block b once the intervening composite plies of candidate block b have been dropped. Thus, in a simple example depicted in FIG. 8, a sublaminate stack may include a stack of four composite plies, namely, composite ply 1 having an orientation of 0 degrees, composite ply 2 having an orientation of +45 degrees, composite ply 3 having an orientation at −45 degrees and composite ply 4 having an orientation of 90 degrees. The sublaminate stack is show in the leftmost column of FIG. 8. This sublaminate stack will be determined to be compatible with block b shown in the middle column of FIG. 8 that has an ordered sequence of 5 composite plies with composite ply 1 having a 0 degree ply orientation, composite ply 2 having a +45 degree ply orientation, composite ply 3 having a 0 degree ply orientation, composite ply 4 having a −45 degree ply orientation and composite ply 5 having a 90 degree ply orientation since composite ply 3 of block b can be dropped with the remaining plies matching those of the sublaminate stack s in terms of the number of composite plies and the order of the ply orientations of the remaining composite plies. However, the same sublaminate stack s would be found not to be compatible with a block shown in the rightmost column of FIG. 8 and having five composite plies ordered with composite ply 1 having an orientation of +45 degrees, composite ply 2 having an orientation of 90 degrees, composite ply 3 having an orientation of 0 degrees, composite ply 4 having an orientation of 90 degrees and composite ply 5 having an orientation of −45 degrees since regardless of which composite ply of the block is dropped, the remaining composite plies do not match those of the sublaminate stack since the resulting ply orientations will be different.

Of the sublaminate stacks s that are compatible with candidate block b, the computing system 30, such as the processing circuitry 32, is configured to determine the matrix $R_{kbs}$ that defines for each different orientation angle k the number of plies of sublaminate stack s that has been determined to be compatible with candidate block b that are included within the sublaminate stack s. Thus, for a sublaminate stack s that is compatible with candidate block b, the computing system, such as the processing circuitry, is configured to determine the count of plies of sublaminate stack s having a ply orientation of 0 degrees, the count of composite plies of sublaminate stack s having a ply orientation of +45 degrees, the count of composite plies of sublaminate stack s having a ply orientation of −45 degrees and the count of composite plies of sublaminate stack s having a ply orientation of 90 degrees.

In addition to defining the matrix $R_{kbs}$, the computing system 30, such as the processing circuitry 32, of this example embodiment is also configured to define a matrix $N_{bs}$ that identifies the number of variations of sublaminate stack s that remain compatible with candidate block b and that have the same ply counts $R_{kbs}$ for the plurality of orientation angles k. See block 56 of FIG. 6. Thus, for each candidate block b, the computing system, such as the processing circuitry, is configured to evaluate each of the compatible sublaminate stacks s to determine the quantity of other sublaminate stacks s that are also compatible with the same candidate block b and that also have the same matrix $R_{kbs}$, that is, the same entries in matrix $R_{kbs}$ for each of the orientation angles k, thereby indicating that these other sublaminate stacks s have the same quantities of plies having each of the different orientation angles k as the sublaminate stacks that is under evaluation. For example, the value of the matrix $N_{bs}$ for a respective candidate block and a respective sublaminate stack s that is compatible with the respective block defines the quantity of other sublaminate stacks that are compatible with the same candidate block b and that also have the same number of composite plies with a ply orientation of 0 degrees, the same number of composite plies with a ply orientation of 45 degrees, the same number of composite plies with a ply orientation of −45 degrees and the same number of composite plies with a ply orientation of 90 degrees as the sublaminate stacks s that is under evaluation.

As shown in block 86 of FIG. 7 by way of further example, the computing system 30, such as the processing circuitry 32 of an example embodiment is configured to generate, for each candidate block b, a compatibility map in the form of a matrix $R_{kbs}$ that designates the number of composite plies of sublaminate stack s that is compatible with candidate block b that have orientation angle k and a matrix $N_{bs}$ that identifies the number of variations of sublaminate stack s that remain compatible with candidate block b and that have the same ply counts $R_{kbs}$ for the plurality of orientation angles k.

Figures 8, 9:
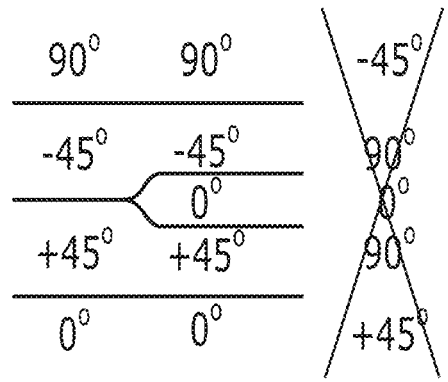
FIG. 8 is a representation of a sublaminate stack s that is compliant with one block, but not compliant with another block.
FIG. 9 depicts four different sublaminate stacks that are compliant with a candidate block.

With reference now to FIG. 9 by way of example, there are four different ways that a sublaminate stack defined by an ordered sequence of composite plies having ply orientations of [45/−45/90/0] is compatible with a candidate block b having ply orientations of [45/0/−45/90/45/0/−45/90/45/0/−45/90]. In this regard, FIG. 9 depicts the candidate block b in the leftmost column and the four different ways that the sublaminate stack is compatible with the candidate block b in the four columns to the right. The designation * in FIG. 9 denotes a composite ply of block b that has been dropped and is not included in the respective sublaminate stack.

As shown in block 58 of FIG. 6, the computing system 30, such as the processing circuitry 32, is configured to determine, separately for each of the plurality of candidate blocks, in accordance with the constrained, linear integer optimization formulation a sublaminate stack from among the plurality of sublaminate stacks that are compatible with a respective candidate block. In relation to determining the sublaminate stack in accordance with the constrained, linear integer optimization formulation, the computing system, such as the processing circuitry, is configured to select the sublaminate stack for a respective candidate block based upon a number of other sublaminate stacks that have the same ply counts $R_{kbs}$ and are compatible with the respective candidate block. More particular, the computing system, such as the processing circuitry, of an example embodiment depicted in block 60 of FIG. 6 is configured to select the sublaminate stack for the respective candidate block by selecting, separately for each of the plurality of candidate blocks, the sublaminate stack for the respective candidate block that maximizes the quantity of sublaminate stacks that have the same ply counts $R_{kbs}$ and are compatible with the respective candidate block. In other words, the computing system, such as the processing circuitry, is configured to evaluate each of the rule-compliant sublaminate stacks s that have been determined to be compliant with candidate block b and to determine which one of these sublaminate stacks has the largest number of variations as defined by the matrix $N_{bs}$ that remain compatible with the candidate block b and that have the same count of plies $R_{kbs}$ for the plurality of ply orientation angles k.

FIG. 7 depicts another example of the constrained, linear integer optimization formulation. In this example embodiment, the computing system 30, such as the processing circuitry 32, is configured to initially assign a plurality of variables and constraints and to identify the objective function that defines the constrained, linear integer optimization formulation as well as the matrices described herein that define the optimization formulation. See blocks 88 and 89. The variables and constraints are described individually below. The computing system, such as the processing circuitry, is then configured to implement the constrained, linear integer optimization formulation as shown in block 90 in order to produce the solution in terms of a selection of candidate blocks to assemble to form the guide 20. See blocks 92 and 94 of FIG. 7.

In an example embodiment, the constrained, linear integer optimization formulation maximizes the quantity of choices of sublaminate stacks while ensuring that the desired ply counts for each region j of the composite structure 10 may be satisfied. In this regard, maximizing the quantity sublaminate choices increases the number of design variables that are available during a subsequent step in the design process in which the ply shapes are defined, e.g., optimized, thereby increasing the likelihood that better ply shapes will be available for selection.

In this regard, a variable $G_{bsj}$ may be defined by the computing system 30, such as the processing circuitry 32, as follows:

$$G_{bsj} \in \{0, 1\}^{N_j \times n_B \times n_s} = \begin{cases} 1, & \text{if block } b \text{ is selected for sublaminate } s \text{ on element } j \\ 0, & \text{else} \end{cases}$$

wherein j designates a composite structure or a region of a composite structure, such as a panel and $N_j$ is the number of elements j. The variable $G_{bsj}$ specifies that for each block of the guide 20 only one candidate block b can be selected with one candidate block being selected in an instance in which $G_{bsj}$ is 1 and no candidate block being selected in an instance in which $G_{bsj}$ is 0. As such, the computing system, such as the processing circuitry, of this example embodiment is configured to maximize the quantity of sublaminate stacks that are compatible with respective block by maximizing the following equation:

$$\sum_{j,b} N_{bs} \cdot G_{bsj}$$

As shown in block 108 of FIG. 7, the linear integer optimization formulation that is evaluated by the computing system 30, such as the processing circuitry 32, in accordance with an example embodiment is subject to a plurality of constraints. In order to define the constraints, a plurality of other variables are initially defined. In this regard, the computing system, such as the processing circuitry, is configured to determine the variables $H_{bj}$ and $K_b$ as follows:

$$H_{bj} \in \{0, 1\}^{n_{FE} \times n_B} = \begin{cases} 0, & \text{if block } b \text{ is NOT used in element } j \\ 1, & \text{else} \end{cases}$$

$$K_b \in \{0, 1\}^{n_B} = \begin{cases} 0, & \text{if block } b \text{ is NOT used in any element} \\ 1, & \text{else} \end{cases}$$

Thus, $H_{bj}$ defines whether a candidate block b is included or not in a region of a composite structure designated j, while $K_b$ defines whether a candidate block is included or not in the entire composite structure.

Based upon these variables, the computing system 30, such as the processing circuitry 32, of an example embodiment is configured to maximize a quantity of sublaminate stacks in accordance with the linear integer optimization formulation subject to a first constraint of:

$$\sum_{j,b} G_{bsj} + H_{bj} = 1, \forall b, j$$

This constraint requires that only one compatible sublaminate stack is allowed to be chosen per candidate block b or else the candidate block b must not be included in the respective element j.

The computing system 30, such as the processing circuitry 32, of this example embodiment is also configured to ensure that the guide that is formed by the blocks that are selected with the linear integer optimization can accommodate the ply counts for every element j by imposing a second constraint of:

$$\sum_{b} R_{kbs} \cdot G_{bsj} = N_{kj}, \forall j, k$$

This second constraint requires that for each region j, candidate blocks are identified that can produce a combination of compatible sublaminate stacks that match the number of plies of each orientation. In other words, the computing system, such as the processing circuitry, is configured to determine the quantity of sublaminate stacks in accordance with the linear integer optimization formulation subject to this second constraint that a total number of plies across the sublaminate stacks determined for the plurality of blocks of the guide 20 equals a predefined ply count, such as the required counts of composite plies of at least one region of the composite structure.

The computing system 30, such as the processing circuitry 32, of this example embodiment is further configured to maximize the quantity of sublaminate stacks in accordance with the linear integer optimization formulation subject to a third constraint of:

$$\sum_b K_b < B_{max}$$

This third constraint limits the quantity of blocks that are utilized to $B_{max}$. $B_{max}$ may be a predefined number of blocks. Alternatively, the sum of Kb could be included as a penalty in the objective function, that is, the constrained, linear integer optimization formulation in order to encourage selection of a smaller number of blocks, eliminating the need to determine $B_{max}$.

The computing system 30, such as the processing circuitry 32, of this example embodiment may be further configured to maximize the quantity of sublaminate stacks in accordance with the linear integer optimization formulation subject to additional constraints in the form of:

$$(1 - K_b) \cdot N_j - \sum_j H_{bj} \leq 0$$

$$K_b + \sum_j H_{bj} \geq 0$$

These additional constraints define the quantity of blocks $K_b$ based on the matrix indicating whether respective candidate blocks b are included or not in respective elements j with candidate blocks b that are not included in an element j satisfying the following equation:

$$\Sigma_j H_{bj} = N_j$$

wherein $N_j$ is the total number of regions.

By reliance upon the constrained, linear integer optimization formulation and subject to the foregoing constraints, the compatible sublaminate stacks s may be evaluated for each of the plurality of candidate blocks b and the sublaminate stack s that maximizes the quantity of sublaminate stacks that have the same ply counts $R_{kbs}$ and are compatible with the respective block may be selected for each respective candidate block b. After having evaluated each of the plurality of candidate blocks b in accordance with the constrained, linear integer optimization formulation, the computing system 30, such as the processing circuitry 32, is configured to define the guide 20 to include the candidate blocks that are identified by the variable $G_{bsj}$ to be included in the guide. Based upon the resulting guide 20, the sublaminate stacks s that have been selected for each of the blocks b that have been included in the guide may be assembled in the same order as the respective blocks b to form the different regions of the composite structure. The guide therefore includes the plurality of sublaminate stacks s that have been identified in accordance with the constrained, linear integer optimization formulation along with, in some embodiments, one or more intervening composite plies that are not included in any of the sublaminate stacks s that have been identified.

By identifying the plurality of sublaminate stacks s that comprise the blocks of the guide 20 based upon a maximization, for each block, of the quantity of sublaminate stacks that have the same ply counts $R_{kbs}$ and are compatible with the respective block, the flexibility with which the sublaminate stacks s of the blocks of the guide may be utilized in order to construct the resulting composite structure or different regions of the composite structure is similarly maximized since the presence of a respective sublaminate stack in the guide permits the respective sublaminate stack or any of the other sublaminate stacks that have the same ply counts $R_{kbs}$ for all ply orientation angles k to be utilized. Thus, the likelihood that the resulting composite structure or various regions of the resulting composite structure will include one or more of the sublaminate stacks is maximized and the quantity of sublaminate stacks included in the resulting composite structure or different regions of the resulting composite structure is correspondingly maximized, thereby increasing the efficiency with which the resulting composite structure is designed since each of the sublaminate stacks s have previously been determined to satisfy the stacking sequence rules and, as a result, need not be further evaluated in terms of the stacking sequence rules during the design and construction of the of the composite structure itself.

Moreover, by utilizing a constrained, linear integer optimization formulation, the plurality of sublaminate stacks s and the particular sublaminate stacks s that are included in the guide 20 are also determined in an efficient manner, particularly as the sublaminate stacks s that are rule compliant may be determined in advance along with a number of other variables, thereby enhancing the efficiency with which the evaluation of the constrained, linear integer optimization formulation is determined. Indeed, the stacking sequence rules need not serve as constraints during evaluation of the constrained, linear integer optimization formulation since the sublaminate stacks that are evaluated have previously been determined to comply with the stacking sequence rules. By performing the constrained, linear integer optimization formulation in an efficient manner without consideration of the stacking sequence rules as constraints as described above, both processing resources and processing time are conserved, thereby providing numerous technical advantages.

FIGS. 5-7 illustrate flowcharts describing the operation of computing systems 30, methods, and computer program products according to examples of the disclosure. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by the memory 34 of the computing system employing an example of the present disclosure and executed by processing circuitry 32. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

That which is claimed:

1. A method for defining a guide comprised of one or more defined sets of ordered ply orientations, the method comprising:
   receiving a plurality of stacking sequence rules; and
   defining the guide comprised of the one or more defined sets of ordered ply orientations in accordance with a constrained, linear integer optimization formulation, wherein defining the guide comprises:
   dividing the guide into a plurality of blocks;
   determining a plurality of sublaminate stacks that satisfy the plurality of stacking sequence rules and that have a size limited by a size of the plurality of blocks;
   for each of the plurality of blocks, determining in accordance with the constrained, linear integer optimization formulation a sublaminate stack from among the plurality of sublaminate stacks that is compatible with a respective block; and
   defining a matrix $R_{kbs}$ of ply counts of plies of sublaminate stacks of the plurality of sublaminate stacks that is compatible with candidate blocks b that have an orientation angle k;
   storing the guide in a memory, wherein the guide is used to define sequences of ply orientations that satisfy predetermined stacking sequence rules for a composite structure; and
   guiding assembly of the composite structure according to the guide.

2. A method according to claim 1 further comprising defining a matrix $N_{bs}$ of a number of variations of the sub laminate stacks that remain compatible with the candidate blocks b of a plurality of candidate blocks and that have the same ply counts $R_{kbs}$ for a plurality of orientation angles k.

3. A method according to claim 2 wherein the plurality of sublaminate stacks are determined and the matrices $R_{kbs}$ and $N_{bs}$ are defined prior to determining the plurality of sublaminate stacks in accordance with the constrained, linear integer optimization formulation.

4. A method according to claim 1 wherein determining the sublaminate stack in accordance with the constrained, linear integer optimization formulation comprises selecting the sublaminate stack for the respective block based upon a quantity of other sublaminate stacks that have equivalent ply counts and are compatible with the respective block.

5. A method according to claim 4 wherein selecting the sublaminate stack for the respective block comprises selecting, for each of the plurality of blocks, the sublaminate stack for the respective block that maximizes the quantity of other sublaminate stacks that have equivalent ply counts and are compatible with the respective block, and wherein determining the sublaminate stacks in accordance with the constrained, linear integer optimization formulation comprises constraining the constrained, linear integer optimization formulation such that a total number of plies across the sublaminate stacks determined for the plurality of blocks of the guide equals a predefined ply count.

6. A computing system for defining a guide comprised of one or more defined sets of ordered ply orientations, the computing system comprising processing circuitry configured to:
   receive a plurality of stacking sequence rules; and
   define the guide comprised of the one or more defined sets of ordered ply orientations in accordance with a constrained, linear integer optimization formulation, wherein the processing circuitry is configured to define the guide by:
   dividing the guide into a plurality of blocks;
   determining a plurality of sublaminate stacks that satisfy the plurality of stacking sequence rules and that have a size limited by a size of the plurality of blocks;
   for each of the plurality of blocks, determining in accordance with the
   constrained, linear integer optimization formulation a sublaminate stack from among the plurality of sublaminate stacks that is compatible with a respective block; and
   defining a matrix $R_{kbs}$ of ply counts of plies of sublaminate stacks of the plurality of sublaminate stacks that is compatible with candidate blocks b that have an orientation angle k;
   store the guide in a memory, wherein the guide is used to define sequences of ply orientations that satisfy predetermined stacking sequence rules for a composite structure; and
   guide assembly of the composite structure according to the guide.

7. A computing system according to claim 6 wherein the processing circuitry is further configured to define a matrix $N_{bs}$ of a number of variations of the sublaminate stacks that remain compatible with the candidate blocks b of a plurality of candidate blocks and that have the same ply counts $R_{kbs}$ for a plurality of orientation angles k.

8. A computing system according to claim 7 wherein the processing circuitry is configured to determine the plurality of sublaminate stacks and to define the matrices $R_{kbs}$ and $N_{bs}$ prior to determining the plurality of sublaminate stacks in accordance with the constrained, linear integer optimization formulation.

9. A computing system according to claim 6 wherein the processing circuitry is configured to determine the sublaminate stack in accordance with the constrained, linear integer optimization formulation by selecting the sublaminate stack for the respective block based upon a quantity of other sublaminate stacks that have equivalent ply counts and are compatible with the respective block.

10. A computing system according to claim 9 wherein the processing circuitry is configured to select the sublaminate stack for the respective block by selecting, for each of the plurality of blocks, the sublaminate stack for the respective block that maximizes the quantity of other sublaminate stacks that have equivalent ply counts and are compatible with the respective block, and wherein the processing circuitry is configured to determine the sublaminate stacks in accordance with the constrained, linear integer optimization formulation by constraining the constrained, linear integer optimization formulation such that a total number of plies across the sublaminate stacks determined for the plurality of blocks of the guide equals a predefined ply count.

11. A computing system according to claim 6 wherein the processing circuitry is configured to determine the sublaminate stack in accordance with the constrained, linear integer optimization formulation by constraining the constrained, linear integer optimization formulation such that no more than one sublaminate stack is selected for the respective block.

12. A computer program product for defining a guide comprised of one or more defined sets of ordered ply orientations, the computer program product comprising at least one non-transitory computer-readable storage medium having computer executable program code instructions stored therein, the program code instructions configured to:
receive a plurality of stacking sequence rules; and
define the guide comprised of the one or more defined sets of ordered ply orientations in accordance with a constrained, linear integer optimization formulation, wherein the program code instructions configured to define the guide comprise program code instructions configured to:
divide the guide into a plurality of blocks;
determine a plurality of sublaminate stacks that satisfy the plurality of stacking sequence rules and that have a size limited by a size of the plurality of blocks;
for each of the plurality of blocks, determine in accordance with the constrained, linear integer optimization formulation a sublaminate stack from among the plurality of sublaminate stacks that is compatible with a respective block; and
define a matrix $R_{kbs}$ of ply counts of plies of sublaminate stacks of the plurality of sublaminate stacks that is compatible with candidate blocks b that have an orientation angle k;
store the guide in a memory, wherein the guide is used to define sequences of ply orientations that satisfy predetermined stacking sequence rules for a composite structure; and
guide assembly of the composite structure according to the guide.

13. A computer program product according to claim 12 wherein the program code instructions are further configured to define a matrix $N_{bs}$ of a number of variations of the sublaminate stacks that remain compatible with the candidate blocks b of a plurality of candidate blocks and that have the same ply counts $R_{kbs}$ for a plurality of orientation angles k.

14. A computer program product according to claim 12 wherein the program code instructions configured to determine the sublaminate stack in accordance with the constrained, linear integer optimization formulation comprise program code instructions configured to select the sublaminate stack for the respective block based upon a quantity of other sublaminate stacks that have equivalent ply counts and are compatible with the respective block.

15. A computer program product according to claim 14 wherein the program code instructions configured to select the sublaminate stack for the respective block comprises program code instructions configured to select, for each of the plurality of blocks, the sublaminate stack for the respective block that maximizes the quantity of other sublaminate stacks that have equivalent ply counts and are compatible with the respective block, and wherein the program code instructions configured to determine the sublaminate stacks in accordance with the constrained, linear integer optimization formulation comprise program code instructions configured to constrain the constrained, linear integer optimization formulation such that a total number of plies across the sublaminate stacks determined for the plurality of blocks of the guide equals a predefined ply count.

16. A computer program product according to claim 12 wherein the program code instructions configured to determine the sublaminate stack in accordance with the constrained, linear integer optimization formulation comprise program code instructions configured to constrain the constrained, linear integer optimization formulation such that no more than one sublaminate stack is selected for the respective block.

17. The method of claim 1, wherein the predetermined stacking sequence rules for the composite structure define a sequence in which composite plies can be stacked and oriented to achieve at least predefined strength and stiffness.

18. The computing system of claim 6, wherein the predetermined stacking sequence rules for the composite structure define a sequence in which composite plies can be stacked and oriented to achieve at least predefined strength and stiffness.

19. The computer program product of claim 12, wherein the predetermined stacking sequence rules for the composite structure define a sequence in which composite plies can be stacked and oriented to achieve at least predefined strength and stiffness.

20. The method of claim 1, wherein guiding assembly of the composite structure according to the guide comprises providing assembly instructions to a layup machine to fabricate the composite structure according to the guide.

* * * * *